United States Patent

[11] 3,610,399

[72] Inventor Herman G. Friedrich
Milwaukee, Wis.
[21] Appl. No. 856,594
[22] Filed Sept. 10, 1969
[45] Patented Oct. 5, 1971
[73] Assignee A-T-O Inc.
Cleveland, Ohio.

[54] ARTICLE CONVEYOR HAVING EJECTING MEANS FOR TIPPED OR FALLEN ARTICLES
2 Claims, 4 Drawing Figs.

[52] U.S. Cl. .................................................. 198/33 R, 198/188
[51] Int. Cl. .................................................. B65g 47/24
[50] Field of Search ............................................. 198/33

[56] References Cited
UNITED STATES PATENTS

| | | | |
|---|---|---|---|
| 2,857,037 | 10/1958 | Breeback | 198/34 A UX |
| 2,885,065 | 5/1959 | Piper | 198/188 |
| 3,097,732 | 7/1963 | Engleson et al. | 198/33 |
| 3,369,642 | 2/1968 | Hennig | 198/33 |

Primary Examiner—Gerald M. Forlenza
Assistant Examiner—Frank E. Werner
Attorney—John K. Crump ABSTRACT: A conveyor for upright, generally cylindrical articles, especially bottles and cans, comprising the combination with a powered linkage-type conveyor chain defining a longitudinally extending support surface for the articles, of a pair of opposed, generally rectilinear guide rails normally confining the articles for travel on such surface and which are interrupted at selected positions along the length of the surface to receive sets of arcuately curved guide plates designed to sweep the articles relatively toward one side of the support surface during movement between such plates. The particular one of the arcuately curved guide plates toward which the articles are swept in each such interruption in the side rails is of the reduced vertical extent relatively of its companion plate and is spaced above the plane of the support surface a distance which is in excess of the maximum outside diameter or transverse dimension of the articles being handled so as to enable such articles as are in a horizontal or tipped position on the support surface to eject off the side of the conveyor in moving between a set of curved guide plates.

PATENTED OCT 5 1971 3,610,399
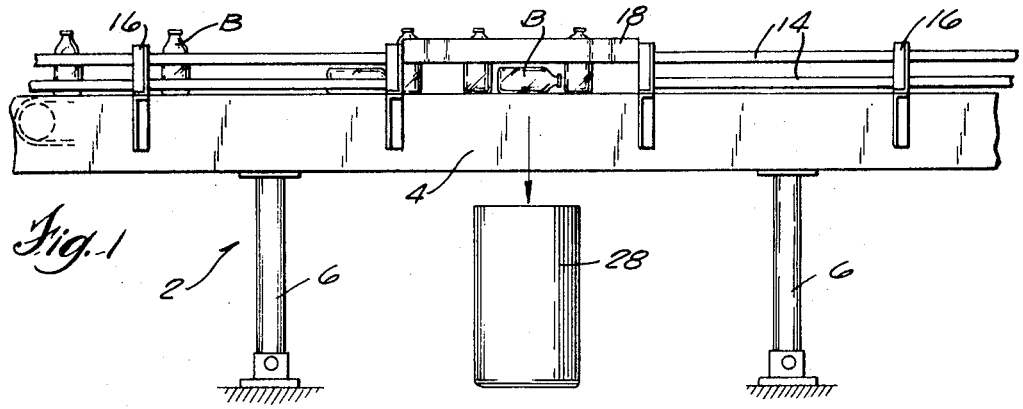
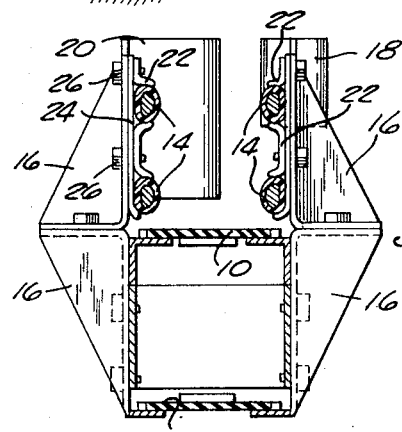
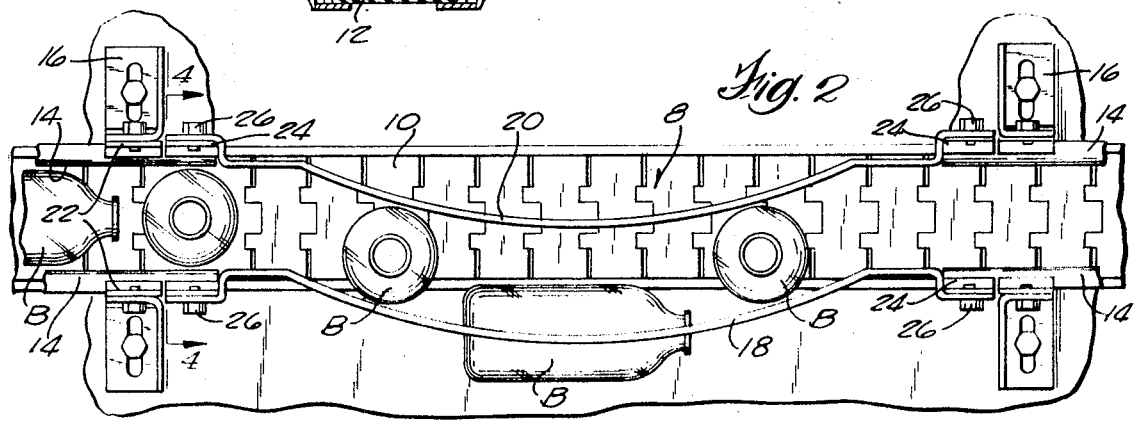
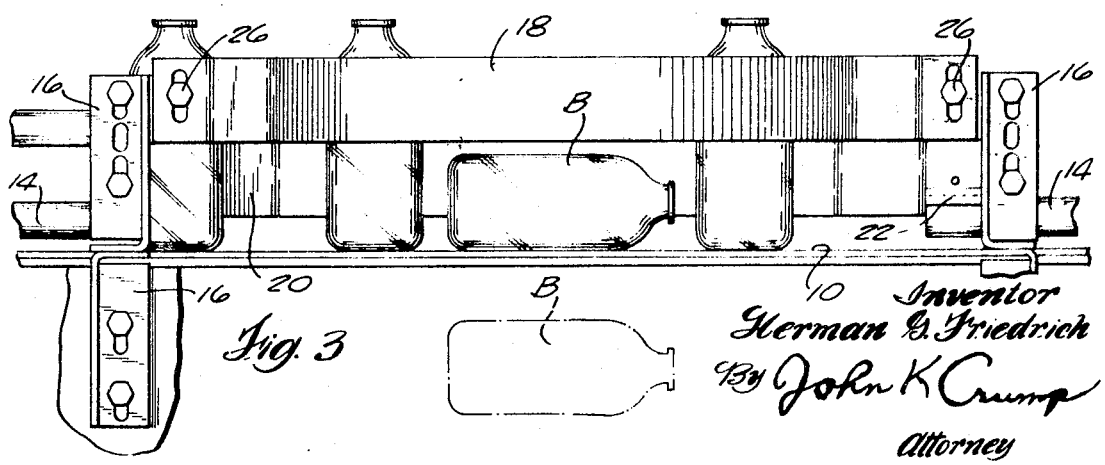
Inventor
Herman G. Friedrich
By John K. Crump
Attorney

ARTICLE CONVEYOR HAVING EJECTING MEANS FOR TIPPED OR FALLEN ARTICLES

This invention relates to a conveyor for upright articles such as bottles, cans and the like and more particularly is directed to a conveyor which is designed to automatically eject or eliminate from a line of articles moving thereover any articles in a horizontal or tipped position.

In the bottling and canning lines of soft drink plants and breweries, it is not altogether infrequent for individual or groups of the containers, be they bottles or cans, to tip or fall over in the course of being conveyed from one processing machine or station to the next, especially during periods of sudden acceleration or deceleration or during the combining of separate lines of containers into single file order or during dividing of a single line of containers into two or more separate lines. Such containers invariably assume a feed-blocking position on the conveyor line and it becomes necessary in order to maintain a continuing feed of containers to downstream processing equipment or stations to quickly remove any such container or containers from the line or to restore the same to an upright position thereon. Any delay in effecting removal or in taking other remedial action is particularly to be avoided as ensuing containers in the line in driving into a fallen or tipped container or group of containers sustain rather substantial impact forces and as these forces are transmitted back along the line additional of the containers may topple or fall and eventually produce a rather widespread or extensive blockage in the line. Obviously, any such interruptions in container feed reduce line efficiency and production output.

The problem of tipped or fallen containers is particularly acute in conveyor portions adjacent the infeed zones or regions of the line processing machines or stations as a container which falls or topples on the conveyor in such areas may continue in its movement thereon and feed or proceed into the processing machine or station proper. Inasmuch as the typical processing machine or station is prepared to handle only upright containers, invariably any such tipped container will cause a jamming of the machine or station or otherwise impair operation to the extent requiring a stoppage of operation to enable a clearing of the container form the machine or station and a restoration of the same to proper operating condition. In a particularly aggravated case of "jamming," the operating components of the processing machine or station may sustain damage and line shutdown may as a result thereof become quite prolonged. Then too, in handling containers of a frangible nature, there may be breakage of the container and fragments thereof may, unless removed, cause subsequent impairment of machine operation and necessitate further stoppages in operation.

While the consequences of container tipping or falling on line efficiency and production output have long been recognized and emphasized, to the present time at least little effort has been made to alleviate the problem and, in the usual instance, the detection of fallen or tipped containers in the line and the removal or righting of such containers is performed manually. Generally, however, these manual procedures are far from satisfactory as the very length of the usual conveyor or processing line makes it physically impossible or difficult for such manual detection and remedial procedures to be performed with any real degree of efficiency and with the promptness which is ordinarily required to prevent interruption or shutoff of container feed in the line. Further, in many instances, the responsibility for line scrutiny evolves upon an operator or operators having other duties or responsibilities in the line and, as a result thereof, the time lag between detection and actual removal or righting of a tipped container or group of containers often is quite substantial.

In order to circumvent the aforementioned difficulties attendant to manual-type detection and removal techniques for tipped or fallen containers, and to provide increased line efficiency and output, the present invention contemplates the provision in the line of one or more conveyor sections which function to automatically eject from the line any container or containers which are in a horizontal rather than a vertical or upright position, as a normal incident of the conveyance function of such conveyor section.

The present invention may be practiced with a conveyor length or section of any conventional design an which has a powered linkage-type conveyor chain for supporting the containers and sets of opposed guide rails for maintaining the containers on such chain by mounting between interruptions which may be specially provided in the rails or to the extremities of the rails sets of similarly curved guide plates designed to impart a lateral or sidewise component of motion to the containers during a portion of their travel along the length of the conveyor. The curved guide plate to the side of the conveyor toward which the articles are swept is of a reduced vertical extent relative to its companion plate and is, in each instance, spaced above the plane of the conveyor chain a distance which exceeds the maximum outside dimension of the containers being handled so that a horizontally disposed, fallen or tipped container in proceeding along the conveyor will pass under the plates and eject from the side of the conveyor under the lateral motion imparted thereto by the curved plate portions while at the same time a container in an upright position will merely have an outward "hitch" in its movement through such curved guide plates and will continue in its movement on the conveyor. A box or barrel or other collection means may be provided along the side of the conveyor at each ejection point to receive any containers passing off the side of the conveyor.

In this manner, a relatively convenient, yet reliable, means is provided for automatically eliminating from a processing line any and all containers in a horizontal position while passing in normal fashion all containers in an upright or substantially upright position. The arrangement of the invention may be conveniently applied to existing conveyors and conveyor lines to provide a ready, inexpensive solution to the problems created by fallen or tipped containers in the line.

The above and other objects and advantages of the present invention will become apparent in the course of the following description of a presently preferred embodiment of the invention.

The drawings furnished herewith illustrate the best mode presently contemplated of carrying out the invention.

In the drawings:

FIG. 1 is a side elevation of a length of conveyor incorporating the novel ejection means of the invention;

FIG. 2 is an enlarged top plan view of a fragmentary portion of the conveyor showing the general layout of the novel ejecting means provided the conveyor;

FIG. 3 is a side elevation of the portion of the conveyor shown in FIG. 2, showing a further view of the guide plate ejection means; and FIG. 4 is an enlarged, transverse section of the conveyor, illustrating the manner in which the guide rail and plate structure are supported in the framework and taken on the lines 4—4 of FIG. 2.

Referring now to the drawings, a section of a conveyor 2 incorporating the novel construction of the invention operates to move containers such as bottles B in single file order in the general direction indicated in the drawing, viz, in a left to right direction. While not shown, the conveyor portion illustrated may be assumed to form a part of a complete bottling line in a soft drink plant or brewery, for example, and as operating to move the bottles relatively from one processing machine or station to another.

The conveyor is for the most part of conventional arrangement and construction, being formed basically of a generally tubular or box section supporting frame 4 fabricated of matching channel rails, for example, and supported by a series of levelling legs 6, an endless plate-type conveyor chain 8 supported longitudinally in the frame and having an upper pass or run 10 defining a planar support surface for the bottles B and a lower return run or pass 12, and opposed pairs of rectilinear guide rails 14 supported in a vertical plane along either side of the frame by a series of upright brackets 16 bolted or otherwise attached to the frame.

Guide rails 14 serve to provide lateral stability to the bottles during movement on the conveyor and, for accommodating bottles of varying shapes and sizes, are mounted to brackets 16 in a manner permitting vertical adjustment with respect to one another while the brackets themselves are both vertically and laterally adjustable with respect to supporting frame 4 to enable a precise setting of the guide rails with respect to the particular type of bottles being handled on the conveyor. Normally, guide rails 14 will be set vertically to extend opposite the bottles at spaced positions adjacent the base and the neck or top portions of the bottles and laterally to a position of close proximity with the outer periphery of the bottles. Thus positioned, the guide rails afford the bottles maximum lateral stability without impairment of bottle movement along the conveyor. Be that as it may, the bottles are nonetheless prone to falling or tipping in either a forward or rearward direction on the conveyor during movement thereon, especially during periods of stopping or starting or other acceleration or deceleration of the conveyor and/or during impact of the containers with one another in the course of filling a gap in the line, for example. If a bottle or group of bottles does fall or tip over on the conveyor, the continued movement of bottles thereover will normally be interrupted and, in some cases, a bottle "jam" may result, requiring stoppage of the conveyor to permit clearing of the "jam." Under some conditions, a fallen bottle may continue to move along the conveyor and may eventually enter the particular processing equipment or machinery immediately downstream of the conveyor. On such an occasion, it usually becomes necessary to stop the operation of such machine to permit extraction of the offending bottle and if such stoppage is not effected quickly, the machine may incur damage or injury, necessitating a prolonged shut-down in the line.

It is apparent that line efficiency and production output can be seriously affected as an incident of bottles tipping or falling while in transit on the conveyor and it should be equally apparent that improved efficiency and increased output may be attained in a bottling line by effecting the prompt removal from the conveyor of any bottles undergoing such tipping or falling movement.

In the present invention, the removal of fallen or tipped bottles from the line is adapted to be automatically effected without in any way interfering with or impairing the normal movement along the conveyor of bottles in an upright or vertical position by incorporating into the guide rail structure at one or more desired sections of the conveyor sets of special curved guide or ejection plates arranged to impart a side-sweeping motion to the bottles in moving through each such conveyor section and positioned vertically with respect to the plane of the plate-type conveyor chain such as to enable any bottles which are in a tipped or horizontal position to eject off the side of the conveyor in the course of the side-sweeping motion while enabling bottles in a normal upright or substantially upright position to remain on the conveyor for continued movement thereover.

The illustrated section of conveyor is shown to have only one such special adaptation to its guide rail structure and with reference to the drawings, and to FIGS. 2 and 3 in particular, it will be observed that equal lengths of the regular side rails 14 are removed from corresponding sides of the conveyor to receive a respective one of a pair or set of curved guide plates 18 and 20. The plates 18 and 20 are secured in place, in the illustrated construction, by direct affixation to the extremities of the interrupted guide rail sections through means of clips 22 fitting around the upper and lower edges of each of the side rails and connected into an end of the guide plates through a backing plate 24 for the clips by a machine screw 26. The ends of curved plates 18 and 20 are bent outwardly or offset somewhat so as to fit against the outer sides of the guide rail extremities in a manner enabling an unbroken surface at the junction of the guide raise 14 with the guide plates 18 and 20. For vertical adjustment of the curved guide plates 18 and 20, the machine screw apertures therein are vertically elongated as shown.

The curvature of guide plates 18 and 20 as aforesaid is designed to sweep or swing the bottles to one side or the other of conveyor chain 8 and in any particular instance the guide plate to the side toward which the bottles are being swept is provided with a reduced width or vertical extent and positioned vertically with respect to the plane of conveyor chain 8 so that a tipped or fallen bottle may pass under the plate and off the side of the conveyor in response to the side-sweeping action of the curved plates. In the present instance, the bottles are shown to be swept towards guide plate 18 and, hence, it is this plate which is of reduced width or vertical extend, being approximately one-half the width of plate 20. Plate 18 is vertically adjusted such that its lower edge is spaced above the plane of the conveyor chain a distance which is in excess of the maximum outside diameter of the particular type of bottles being handled on the conveyor. The other of the plates, viz, plate 20 is required to be placed with its lower edge just above the plane of the conveyor chain to insure a desired side-sweeping action of tipped as well as upright bottles in moving between any set of the guide plates.

While the particular type and degree of curvature provided guide plates 18 and 20 in any particular instance is largely a matter of individual choice or preference, it should be apparent that a curvature which is too abrupt or compound in nature may preclude the bottles, particularly those in a tipped or horizontal condition, from entering freely between the guide plates and moving therebetween in a smooth, unhindered manner. Generally, it will suffice to provide the guide plates with a simple, arcuate curvature, the slope of which is sufficiently gentle to permit bottles to move through plates 18 and 20 at high speeds without incurring undue bumping or jarring from the plates or from one another in the course of such movement. Generally, too, the guide plates in each set are preferably provided an identical or substantially identical curvature so as to define a bottle flow passage between the plates 18 and 20 which is substantially of constant width over its full length. This aids in maintaining control over the lateral movement of the bottles in progressing through the guide plates.

Further with regard to the matter of the curvature of the guide plates, it has been found in practice that an effective balance can be obtained between the attainment of a completely reliable ejecting arrangement for tipped or fallen bottles and the preservation of driving engagement of the conveyor chain with the upright bottles continuing in movement along the conveyor by a plate curvature which causes the bottles to move off the edge of the conveyor chain a distance which at the maximum equals or approximates the radius of the base of the bottles. Thus, guide plate 20 in a preferred construction or arrangement extends inwardly of conveyor chain 8 to approximately the longitudinal axis or centerline of the chain while the plate 18 extends outwardly from the edge of conveyor chain 8 a distance roughly equal one-half the width of the conveyor chain. While a greater or lesser offset of the guide plates can be employed and still attain the desired ejection or elimination from the conveyor of only those bottles which are in a tipped or horizontal position, the particular arrangement described has been found to provide most optimum all-around operation.

In the illustrated form of the invention, the guide plates are arranged to sweep the bottles towards and to effect bottle ejection from the near side of the conveyor as the latter is viewed in any of FIGS. 1, 2 and 3 of the drawings. The guide plates, however, are interchangeable with one another to provide for bottle ejection from either side of the conveyor. Thus, if it were desired to sweep the bottles off the far side of the conveyor in the illustrated example, both plates would be removed and the plate 18 assembled to the far side of the conveyor, switching the plate end for end or simply turning it vertically through 180°, while assembling plate 20 along the near side of the conveyor, again switching the plate end for end or, alternatively, turning it vertically through 180°. This reversibility feature of the guide plates provides a convenient, simple means for adapting the ejection system to the particular requirements of existing conveyor and processing lines.

In a desired or preferred form of the invention, some type of collection or receiving means is provided for bottles ejecting from the side of the conveyor under the action of the curved guide plates. Such collection or receiving means may simply take the form of a barrel or drum 28 stationed along the side of the conveyor beneath the zone where ejection takes place. Alternatively, where salvage of the bottles is desired a simple flanged plate may be attached horizontally to the side of the supporting framework 4 of the conveyor at the area of bottle ejection to receive and hold for late inspection all bottles ejecting from the conveyor by the action of plates 18 and 20.

The special curved guide plates of the invention may be provided at various locations along the length of a conveyor and particularly at locations which in actual operation have been found to have a relatively high incidence of bottle falling or toppling.

The construction of the invention has particular advantage when incorporated into a conveyor section located immediately upstream of processing mechanisms, such as a high-speed bottle filler or an in-line bottle rinser, for example, which are critical to the efficiency of the line as a whole and which normally would "jam" or become fouled if a bottle in a horizontal position were to feed thereinto.

While described in connection with a conveyor for bottles, the ejection means of the invention may be in a conveyor handling other types of containers such as cans, for example, as well as other types of articles which while normally adapted to be moved in an upright position are susceptible or prone to falling or tipping while in transit.

Various modes of carrying out the present invention are contemplated as being within the scope of the following claims particularly pointing out and distinctly claiming the subject matter regarded as the nature of the invention.

I claim:

1. A conveyor for upright, tippable articles, comprising a propelled, endless conveyance member defining a longitudinally extending conveyance surface for the articles, a pair of substantially rectilinear guide rails arranged one to each side of the conveyance surface defined for the articles by said conveyance member for maintaining the articles on such surface during movement thereover, said guide rails being interrupted at one or more corresponding portions along their respective lengths, and opposed pairs of arcuately curved article ejector plates detachably mounted to a respective one of the guide rails at each such interruption for imparting an arcuate, side-sweeping motion to the articles as the latter move between such plates, with the plate towards which the articles are swept being spaced above the plane of the conveyance surface a distance just in excess of the maximum lateral, outside dimension of the articles being handled in the conveyor so as to permit any article which is in a tipped rather than an upright position to eject off the side of the conveyance surface as it traverses the ejector plates, the ejector plates of any one set being curved identically to one another and formed with end attachment flanges which are mirror images of the flanges of the other of the rails whereby to permit interchanging of the plates on the guide rails to provide for the ejection of the articles off either side of the conveyance surface as desired.

2. The construction of claim 1 in which the ejector plates have a vertical extent which is in excess of that of the guide rails whereby to assure the articles of a high degree of lateral stability in moving between such plates.